United States Patent
Kim et al.

(10) Patent No.: US 10,718,980 B2
(45) Date of Patent: Jul. 21, 2020

(54) LIQUID CRYSTAL WINDOW AND OPTICAL ELEMENT COMPRISING IT

(71) Applicant: LG Chem, Ltd., Seoul (KR)

(72) Inventors: Jung Woon Kim, Daejeon (KR); Su Young Ryu, Daejeon (KR); Byoung Kun Jeon, Daejeon (KR); Moon Soo Park, Daejeon (KR)

(73) Assignee: LG Chem, Ltd. (KR)

( * ) Notice: Subject to any disclaimer, the term of this patent is extended or adjusted under 35 U.S.C. 154(b) by 155 days.

(21) Appl. No.: 15/765,619

(22) PCT Filed: Dec. 13, 2016

(86) PCT No.: PCT/KR2016/014567
§ 371 (c)(1),
(2) Date: Apr. 3, 2018

(87) PCT Pub. No.: WO2017/105051
PCT Pub. Date: Jun. 22, 2017

(65) Prior Publication Data
US 2019/0079327 A1     Mar. 14, 2019

(30) Foreign Application Priority Data
Dec. 17, 2015 (KR) .................... 10-2015-0180901

(51) Int. Cl.
*G02F 1/1339* (2006.01)
*G02F 1/1337* (2006.01)
(Continued)

(52) U.S. Cl.
CPC ........ *G02F 1/13392* (2013.01); *G02F 1/1337* (2013.01); *G02F 1/13718* (2013.01);
(Continued)

(58) Field of Classification Search
CPC ............. G02F 1/13392; G02F 1/13781; G02F 1/13718; G02F 1/133528; G02F 1/1337;
(Continued)

(56) References Cited

U.S. PATENT DOCUMENTS 4,966,442 A * 10/1990 Ono .................. G02F 1/133345
349/122
5,220,446 A * 6/1993 Rho .................... G02F 1/13392
349/138
(Continued)

FOREIGN PATENT DOCUMENTS

JP          S5557821 A     4/1980
JP          S55153919 A    12/1980
(Continued)

OTHER PUBLICATIONS

Supplementary European Search Report Including Written Opinion for EP16875993 dated Nov. 14, 2018.
(Continued)

*Primary Examiner* — Huyen L Ngo
(74) *Attorney, Agent, or Firm* — Lerner, David, Littenberg, Krumholz & Mentlik, LLP

(57) ABSTRACT

The present invention relates to a liquid crystal window, a method of manufacturing the same, an optical element comprising the liquid crystal window, and a use thereof. The liquid crystal window of the present invention and its manufacturing method have excellent fixing property of a spacer and thus excellent cell gap maintaining characteristics, and can effectively prevent thermal damage of a base layer and be economical in manufacturing processes.

14 Claims, 3 Drawing Sheets

(51) Int. Cl.
*G02F 1/1335* (2006.01)
*G02F 1/137* (2006.01)

(52) U.S. Cl.
CPC .... *G02F 1/13781* (2013.01); *G02F 1/133528* (2013.01); *G02F 1/13725* (2013.01); *G02F 2202/043* (2013.01); *G02F 2202/28* (2013.01)

(58) Field of Classification Search
CPC ........... G02F 2202/28; G02F 2202/043; G02F 1/13725
See application file for complete search history.

(56) References Cited

U.S. PATENT DOCUMENTS

| | | | | |
|---|---|---|---|---|
| 5,338,240 | A * | 8/1994 | Kim | G02F 1/13394 445/24 |
| 5,885,482 | A | 3/1999 | Asaoka et al. | |
| 6,144,435 | A * | 11/2000 | Yokoyama | G02F 1/133514 349/122 |
| 6,190,774 | B1 | 2/2001 | Tanaka et al. | |
| 7,102,602 | B2 * | 9/2006 | Kim | G02C 7/101 345/32 |
| 2004/0095545 | A1 | 5/2004 | Washizawa et al. | |
| 2007/0195034 | A1 * | 8/2007 | Hayashi | G02F 1/13306 345/87 |
| 2007/0209393 | A1 * | 9/2007 | Miller | B29D 11/0073 65/17.6 |
| 2008/0204645 | A1 * | 8/2008 | Kawabe | G02F 1/13392 349/123 |
| 2009/0015747 | A1 | 1/2009 | Nishizawa et al. | |
| 2009/0033859 | A1 | 2/2009 | Ueda et al. | |
| 2011/0311738 | A1 * | 12/2011 | Nimura | B29C 41/24 428/1.31 |
| 2012/0287380 | A1 | 11/2012 | Hagiwara et al. | |
| 2013/0208197 | A1 | 8/2013 | Kim et al. | |
| 2014/0104548 | A1 * | 4/2014 | Yang | G02F 1/133512 349/106 |
| 2014/0285751 | A1 | 9/2014 | Min et al. | |
| 2015/0077677 | A1 | 3/2015 | Jung et al. | |
| 2015/0109562 | A1 * | 4/2015 | Tamaki | G02F 1/133524 349/96 |
| 2015/0131033 | A1 | 5/2015 | Min et al. | |
| 2016/0252774 | A1 | 9/2016 | Kawamura | |
| 2017/0131591 | A1 * | 5/2017 | Rantala | C08L 83/06 |
| 2017/0153495 | A1 * | 6/2017 | Wei | G02B 5/3016 |
| 2017/0187004 | A1 * | 6/2017 | Giraldo | H01L 51/5253 |
| 2017/0329161 | A1 * | 11/2017 | Baker | G02F 1/1341 |
| 2017/0363905 | A1 * | 12/2017 | Katsuta | G02B 5/00 |

FOREIGN PATENT DOCUMENTS

| | | |
|---|---|---|
| JP | S60153025 A | 8/1985 |
| JP | S60262128 A | 12/1985 |
| JP | H03160414 A | 7/1991 |
| JP | 04304425 A * | 10/1992 |
| JP | H04304425 A | 10/1992 |
| JP | H06175139 A | 6/1994 |
| JP | H09236806 A | 9/1997 |
| JP | 2001033775 A | 2/2001 |
| JP | 2004109856 A | 4/2004 |
| JP | 2007219413 A | 8/2007 |
| JP | 2009020168 A | 1/2009 |
| JP | 2011154327 A | 8/2011 |
| JP | 2014533376 A | 12/2014 |
| JP | 2015072385 A | 4/2015 |
| KR | 930003683 B1 | 5/1993 |
| KR | 19990082475 | 11/1999 |
| KR | 20060072086 A | 6/2006 |
| KR | 20060080129 A | 7/2006 |
| KR | 20070054425 A | 5/2007 |
| KR | 20080017330 A | 2/2008 |
| KR | 20130063485 A | 6/2013 |
| KR | 101422441 B1 | 7/2014 |
| KR | 20150031126 A | 3/2015 |
| WO | 2015133878 A1 | 9/2015 |
| WO | WO-2015133878 A1 * | 9/2015 |

OTHER PUBLICATIONS

Search report from International Application No. PCT/KR2016/014567, dated Mar. 15, 2017.

\* cited by examiner

[Figure 1]
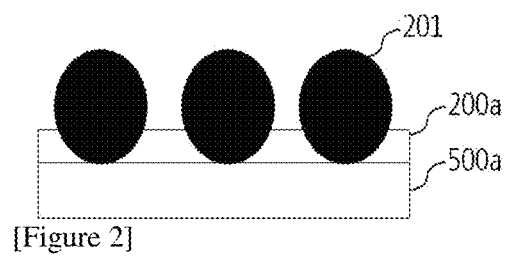
[Figure 2]
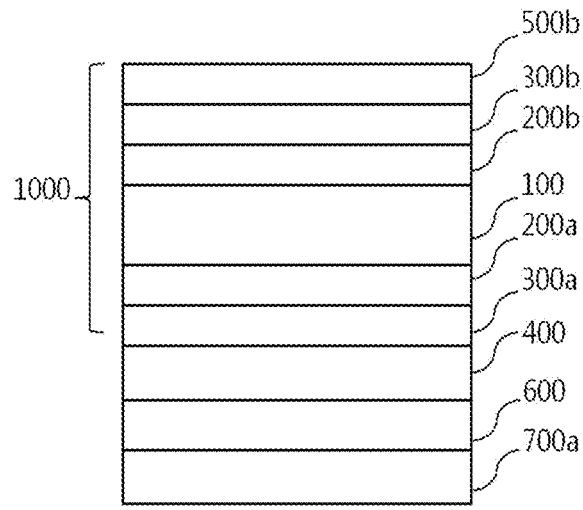

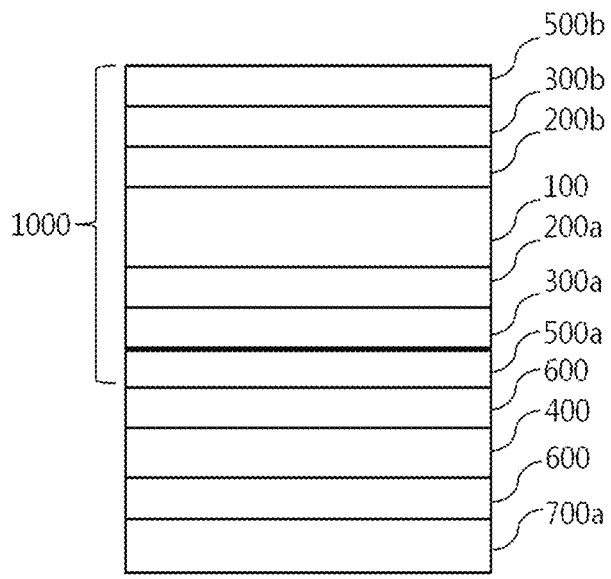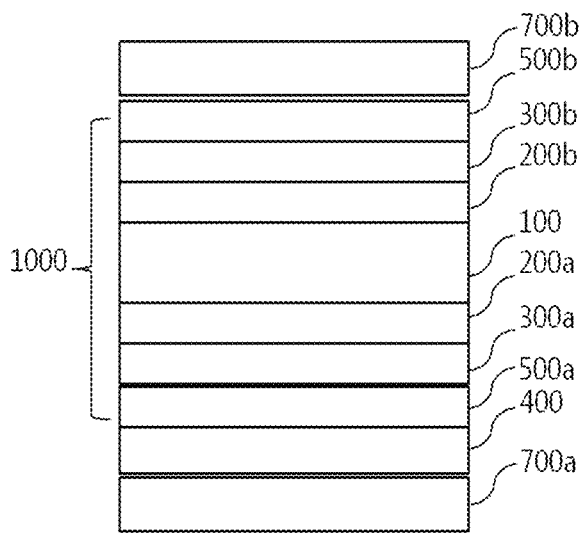

[Figure 5]

|  | SEM Cross-sectional Photograph | Orientation State |
|---|---|---|
| Comparative Example 1 | | |
| Example 1 | | |

[Figure 6]

|  | Initial | Lamination test(1.56 bar) | Lamination test(2.16 bar) |
|---|---|---|---|
| Comparative Example 1 | | NG | - |
| Example 1 | PASS | PASS | PASS |

LIQUID CRYSTAL WINDOW AND OPTICAL ELEMENT COMPRISING IT

CROSS-REFERENCE TO RELATED APPLICATION

The present application is a national phase entry under 35 U.S.C. § 371 of International Application No. PCT/KR2016/014567, filed on Dec. 13, 2016, which claims priority of Korean Patent Application No. 10-2015-0180901, filed on Dec. 17, 2015, the disclosures of which are incorporated herein by reference.

TECHNICAL FIELD

The present invention relates to a liquid crystal window, an optical element, and a use thereof.

BACKGROUND ART

A display using a liquid crystal compound is used in various display devices and transmittance variable devices.

In order to dispose a liquid crystal layer containing a liquid crystal compound between a pair of base layers and maintain a gap between layers located on both sides of the liquid crystal layer, the display using such a liquid crystal compound includes a spacer.

The spacer serving to maintain a cell gap in the liquid crystal display may be in a ball shape or a column shape, and spacers having various shapes and materials may be used depending on the purpose and use of the display device.

Meanwhile, in the case of trying to maintain the cell gap of the liquid crystal layer by using the ball-shaped spacer, there has been a certain problem in performing function maintaining the cell gap due to flowage of the spacer, and to solve this problem, various technologies for fixing the ball spacer have been developed.

Although such a fixing technique of the ball spacer generally adopts a method of melting and fixing a part of the surface of the spacer with heat, this method takes a long time to expose to the heat and has various problems such as damage of the base layer when the temperature is excessively increased, and thus a new need for the method of fixing the ball spacer has been required.

DISCLOSURE

Technical Problem

It is an object of the present invention to provide a liquid crystal window having excellent orientation characteristics and simultaneously excellent cell gap maintaining characteristics by minimizing flowage of spacers, and an optical element comprising the same.

It is another object of the present invention to provide a method of manufacturing a liquid crystal window which prevents damage due to heat, and the like, and is economical in processes.

It is still another object of the present invention to provide a use of a liquid crystal window and an optical element.

Technical Solution

The present invention relates to a liquid crystal window and a method of manufacturing the same, an optical element comprising the liquid crystal window, and a use thereof.

The liquid crystal window of the present invention is used as one constitution of an optical element.

Specifically, the liquid crystal window may comprise a liquid crystal layer whose transmittance changes depending on whether or not external action is applied, thereby enabling selective switching of a transmissive mode or a blocking mode to the optical element.

Such a liquid crystal window of the present invention may prevent damage of the base layer due to heat by improving the fixing method of the spacer capable of maintaining gaps of layers existing in the upper and lower portions of the liquid crystal layer and also have excellent cell gap maintaining characteristics by effectively fixing the spacer.

That is, the liquid crystal window for an optical element of the present invention comprises a liquid crystal layer containing a liquid crystal compound; alignment films positioned on both sides of the liquid crystal layer to induce orientation of the liquid crystal compound; and spacers formed so as to be capable of maintaining gaps of layers existing in the upper and lower portions of the liquid crystal layer, and embedded in and fixed to any one of the alignment films positioned on both sides of the liquid crystal layer.

Generally, in order to fix the spacer included in the liquid crystal window, a fixing method of coating and drying a solution containing spacers on the base layer on which the alignment film is formed, and then additionally applying heat thereto is used, but in this case, deformation of the base layer due to heat may occur, and a lot of time is also required depending on the heating process, so that it is disadvantageous in terms of article productivity, and moreover, by such a fixing method, flowage of spacers may occur, so that there is an disadvantageous aspect for securing the cell gap maintaining characteristics.

Thus, as described below, the present invention can overcome the above-described problems by coating a composition for forming an alignment film containing spacers on a base layer and allowing the spacers to be embedded in the alignment film and fixed.

Here, the term "embedded" may mean a state in which a certain portion of the spacer (201) is included inside the alignment film (200a) formed on the base layer (500a), as shown in FIG. 1.

The liquid crystal window of the present invention may comprise a liquid crystal layer containing a liquid crystal compound whose orientation changes depending on whether or not external action is applied, thereby providing a transmissive mode or a blocking mode of the optical element.

The term "external action" in the present invention means an external force capable of changing the orientation of the liquid crystal compound contained in the liquid crystal layer. In one example, the external action may be an external voltage induced through an electrode layer to be described below.

The liquid crystal compound contained in the liquid crystal layer can be used without limitation in the present invention, as long as it can change the orientation direction depending on the presence or absence of external action.

In one example, as the liquid crystal compound, a smectic liquid crystal compound, a nematic liquid crystal compound or a cholesteric liquid crystal compound, and the like can be used. In addition, the liquid crystal compound may be, for example, a compound which has no polymerizable group or cross-linkable group, so that the orientation direction can be changed by external signal application.

In one example, a nematic liquid crystal compound can be used as the liquid crystal compound. As the above compound, for example, a nematic liquid crystal compound satisfying Equation 1 below can be used.

$$(1.53-b) < \{(2n_o^2 + n_e^2)/3\}^{0.5} < (1.53+b)$$ [Equation 1]

In Equation 1, $n_o$ is an ordinary refractive index of the liquid crystal compound, for example, a refractive index in the uniaxial direction of the nematic liquid crystal compound, $n_e$ is an extraordinary refractive index of the liquid crystal compound, for example a refractive index in the long axis direction of the liquid crystal compound, and b is a number satisfying 0.1 to 1. The liquid crystal compound satisfying Equation 1 can be selected to manufacture a liquid crystal cell in which excellent transparency can be ensured even when no voltage is applied. In Equation 1, b may be, in another example, 0.1 to 0.9, 0.1 to 0.7, 0.1 to 0.5 or 0.1 to 0.3.

The liquid crystal compound may also have a difference between an extraordinary dielectric anisotropy ($\varepsilon_e$, dielectric anisotropy of the long axis direction) and an ordinary dielectric anisotropy ($\varepsilon_o$, dielectric anisotropy of the uniaxial direction) of at least 3, at least 3.5, at least 4, at least 6, at least 8, or at least 10. Having such a dielectric anisotropy, an element having excellent driving voltage characteristics can be provided. In the difference of the dielectric anisotropy, the higher the numerical value, the element may exhibit more appropriate characteristics, where the upper limit is not particularly limited. For example, as the liquid crystal compound, a compound having an extraordinary dielectric anisotropy ($\varepsilon_e$) of 6 to 50 and an ordinary dielectric anisotropy ($\varepsilon_o$) of 2.5 to 7 may be used.

The liquid crystal layer may further comprise an anisotropic dye.

In the present invention, the term "dye" may mean a material capable of intensively absorbing and/or deforming light in at least some or all the range within a visible light region, for example, a wavelength range of 400 nm to 700 nm, and the term "anisotropic dye" may mean a material allowing anisotropic absorption of light in at least some or all the range of the visible light region.

The light transmittance of the liquid crystal window and the optical element comprising the same can be controlled through using the anisotropic dye as above. Although the anisotropic dye is not particularly limited, for example black dyes or color dyes can be used.

As the anisotropic dye, a dye having a dichroic ratio, that is, a value dividing the absorption of the polarized light parallel to the long axis direction of the anisotropic dye by the absorption of the polarized light parallel to the direction vertical to the long axis direction, of at least 1, at least 2 or at least 3, can be used. The dye can satisfy the dichroic ratio in at least some wavelengths or at any one wavelength within the wavelength range of the visible light region, for example, within the wavelength range of about 380 nm to 700 nm or about 400 nm to 700 nm. The upper limit of the dichroic ratio may be, for example, 30 or less, 20 or less, 15 or less, or 14 or less. That is, the dichroic ratio may be 1 to 30, 2 to 20, 3 to 15 or 3 to 14. The kind of the anisotropic dye is not particularly limited, and for example, all kinds of dyes known to have characteristics capable of being oriented according to orientation of the liquid crystal compound while having the above characteristics, can be used.

When the anisotropic dye is included in the liquid crystal layer, it is possible to promote thinning of the element comprising the liquid crystal window.

Specifically, when the liquid crystal compound and the anisotropic dye are included in the optical element, the orientation of the liquid crystal compound and the anisotropic dye present in the liquid crystal layer is controlled, so that the anisotropic light absorption may be controlled for the polarized light of the direction parallel to the orientation direction of the anisotropic dye and the polarized light of the direction vertical thereto.

For example, the orientation of the liquid crystal compound and/or the anisotropic dye in the liquid crystal layer can be controlled by application of the external signal, and accordingly the liquid crystal layer can control the anisotropic light absorption depending on whether or not the external signal is applied.

Such an anisotropic dye may be included in the liquid crystal layer, for example, in a ratio of 1 to 10 parts by weight or 1 to 5 parts by weight, relative to 100 parts by weight of the liquid crystal compound.

The liquid crystal compound may be contained in the liquid crystal layer, while having a certain orientation.

In one example, the liquid crystal compound can be oriented in the horizontal, vertical, or oblique orientation in the absence of external action.

In the present invention, the term "horizontal orientation" may mean a case where the optical axis of the liquid crystal layer has an inclination angle within a range of about 0 to 15 degrees, about 0 to 10 degrees, and about 0 to 5 degrees with respect to the plane of the liquid crystal layer.

In the present invention, the term "vertical orientation" may mean a case where the optical axis of the liquid crystal layer has an inclination angle of about 90 to 85 degrees with respect to the plane of the liquid crystal layer.

In the present invention, the term "oblique orientation" may mean a case where the optical axis of the liquid crystal layer has an inclination angle other than the horizontal orientation or the vertical orientation with respect to the plane of the liquid crystal layer, and for example, may mean a case where the optical axis of the liquid crystal layer has an inclination angle of more than about 15 degrees to less than 85 degrees with respect to the plane of the liquid crystal layer.

The orientation condition of such a liquid crystal compound can be appropriately adjusted in consideration of the drive mode of the liquid crystal window and the dielectric anisotropy characteristics of the liquid crystal compound.

The liquid crystal layer may have predetermined plane retardation (Rin) and thickness direction retardation (Rth).

In one example, the plane direction retardation (Rin) of the liquid crystal layer in a state that the liquid crystal compound is horizontally oriented in the liquid crystal layer may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, the upper limit of the plane direction retardation of the liquid crystal layer in the absence of any external action may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less. That is, the plane direction retardation (Rin) may be 10 to 300 nm, 50 to 250 nm, or 100 to 200 nm.

Furthermore, in a state where the external action is present and the liquid crystal compound is vertically oriented, the thickness direction retardation (Rth) of the liquid crystal layer may be, for example, 10 nm or more, 20 nm or more, 30 nm or more, 40 nm or more, 50 nm or more, 60 nm or more, 70 nm or more, 80 nm or more, 90 nm or more, 100 nm or more, 110 nm or more, 120 nm or more, 130 nm or more, or 140 nm or more. In addition, when the external action is present, the upper limit of the thickness direction retardation of the liquid crystal layer may be 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, or 160 nm or less. That is, the thickness direction retardation (Rth) may be 10 to 300 nm, 50 to 250 nm, or 100 to 200 nm.

In the present invention, the term "plain direction retardation (Rin)" is a numerical value calculated by Equation 2 below, and the term "thickness direction retardation (Rth)" is a numerical value calculated by Equation 3 below.

$$Rin=(nx-ny)\times d \quad \text{[Equation 2]}$$

$$Rth=(nz-ny)\times d \quad \text{[Equation 3]}$$

In Equations 2 and 3, the symbols of nx, ny, nz and d mean a refractive index in the in-plane slow axis direction, a refractive index in the in-plane fast axis direction, a refractive index in the thickness direction, and a thickness, respectively. Each of the refractive indices may be, for example a refractive index measured for light having a wavelength of 550 nm.

Depending on the orientation of the liquid crystal compound, the transmittance of the liquid crystal window and the optical element can be controlled.

The liquid crystal window may be driven in an ECB (Electrically Controlled Birefringence) mode, a TN (Twisted Nematic) mode or an STN (Super Twisted Nematic) mode, without being limited thereto, and the alignment characteristics of the liquid crystal compound in the liquid crystal layer may be changed depending on the drive mode of such a liquid crystal window, the details of which will be described below in the optical element section.

When the liquid crystal window is driven in the TN mode or the STN mode, the liquid crystal layer may further comprise a chiral agent. The chiral agent can induce for the molecular arrangement of the liquid crystal compound and/ or the anisotropic dye to have a helical structure. The chiral agent may be used without particular limitation, as long as it can induce the desired helical structure without damaging liquid crystallinity, for example, nematic regularity. The chiral agent for inducing the helical structure in the liquid crystal needs to include at least the chirality in the molecular structure. As the chiral agent, for example, compounds having one or two or more asymmetric carbons, compounds having an asymmetric point on a heteroatom such as chiral amines or chiral sulfoxides, or compounds having an axially asymmetric and optically active site such as cumulene or binaphthol can be exemplified. The chiral agent may be, for example, a low molecular compound having a molecular weight of 1,500 or less. As the chiral agent, a commercially available chiral nematic liquid crystal, for example, a chiral dopant liquid crystal S-811 available from Merck Co. or LC756 from BASF may be also used.

The thickness of the liquid crystal layer may be, for example, in a range of 5 to 30 μm or 10 to 25 μm. It is possible within such a thickness range to appropriately adjust the transmittance and to prevent the deformation of the element due to thermal deformation, and accordingly damage of the liquid crystal layer, and the like.

Such a liquid crystal layer may be prepared, for example, by using a method of squeezing a composition comprising the aforementioned liquid crystal compound and/or anisotropic dye and other additives on a base layer disposed apart from each other while sealing the sides, or by coating the composition on any base material and then laminating the peeled film with the base layer, or by a known method of forming a liquid crystal layer, such as a formation method of coating the composition directly on the base layer and then curing the composition.

The liquid crystal window may further comprise a base layer positioned in one or both side directions of the liquid crystal layer.

In one example, the base layer may be also located only in one side direction of the liquid crystal layer as shown in FIG. 2, or may be also located in both side directions of the liquid crystal layer as shown in FIGS. 3 and 4. The specific position of the base layer may differ depending on the structure of the optical element comprising the liquid crystal window.

The base layer may be one having predetermined elastic modulus and coefficient of thermal expansion (CTE).

In one example, the base layer may have a coefficient of thermal expansion (CTE) of 100 ppm/K or less, 90 ppm/K or less, 80 ppm/K or less, 70 ppm/K or less, 60 ppm/K or less, 50 ppm/K, 40 ppm/K or less, 30 ppm/K or less, or 20 ppm/K or less. The lower limit of the coefficient of thermal expansion (CTE) may be, for example, 3 ppm/K or more, 5 ppm/K or more, or 7 ppm/K or more, but is not limited thereto. That is, the coefficient of thermal expansion of the base layer may be 3 to 100 ppm/K, 5 to 80 ppm/K or 7 to 60 ppm/K. Within such a range of coefficient of thermal expansion (CTE), the appropriate rigidity can be maintained, and the thermal deformation according to the laminated structure of the liquid crystal window, the polarizing layer and the like can be prevented. The value of the coefficient of thermal expansion (CTE) may be, for example, a value calculating the average thermal expansion coefficient measured with cooling and heating at a rate of 10° C./min in a temperature range of 0° C. to 100° C. as a coefficient of linear thermal expansion.

The base layer may have, for example, an elastic modulus of 20 GPa or less, 15 GPa or less, or 10 GPa or less. The lower limit value of the elastic modulus may be, for example, 0.5 GPa or more, or 2.5 GPa or more. That is, the elastic modulus of the base layer may be 0.5 to 20 GPa, 2.5 to 15 GPa, or 2.5 to 10 GPa. Within such a range of elastic modulus, the appropriate rigidity can be maintained, the thermal deformation according to the laminated structure of the liquid crystal window, the polarizing layer and the like can be prevented. The elastic modulus value may mean a value measured according to ASTM D882.

Preferably, the base layer is, for example, a transparent base film having a haze of 5% or less, or 3% or less.

The base layer may also be one having a refractive index at 550 nm of 1.5 to 2.0, or 1.5 to 1.7.

The thickness of the base layer may be, for example, 30 to 300 μm, preferably 40 to 250 μm.

The glass transition temperature of the base layer may be, for example, in the range of 100° C. to 300° C., preferably 100° C. to 150° C.

In addition, the base layer may be a flexible layer with an elastic modulus in the range of 0.05 MPa to 5,000 MPa.

The material of the base layer is not limited as long as it satisfies the above-mentioned conditions, but may be, for example, a polyolefin-based material such as polyethylene or polypropylene; a polyester-based material such as polyethylene terephthalate and polyethylene naphthalate; a cellulosic material such as triacetylcellulose, diacetylcellulose, propionylcellulose, butylcellulose or acetylcellulose; a polyamide-based material such as 6-nylon or 6,6-nylon; an acrylic material such as polymethyl methacrylate; a polymer film formed from an organic polymer such as polystyrene, polyvinyl chloride, polyimide, polyvinyl alcohol, polycarbonate or ethylene vinyl alcohol, or may be a glass substrate.

The base layer may be one formed from one or a mixture or polymer of two or more of the above materials, or may be also one having a structure in which a plurality of layers are laminated.

The base layer may be one whose surface has been modified. The surface modification is carried out for the purpose of securing the adhesive force with the electrode layer, for which a treatment method such as chemical treatment, corona discharge treatment, mechanical treatment, ultraviolet (UV) treatment, active plasma treatment or glow discharge treatment may be adopted, but is not limited thereto.

For example, the above base layer can be prepared by blending the above-mentioned material with a known mixer (e.g., Omni mixer or the like), mixing the obtained mixture with a known mixer (e.g., an extruder such as a single screw extruder and a twin screw extruder, or a pressurized kneader or the like), and then performing a known film forming method (e.g., solution casting method, melt extrusion method, calendering method, compression molding method, etc.), and in particular, it is preferably prepared by solution casting method or melt extrusion method.

The liquid crystal window may further comprise an electrode layer capable of applying external action, for example, an external electric field to the liquid crystal layer. The electrode layer may be formed, for example, on the base layer.

The electrode layer can have, for example, a high light transmittance in a visible light region.

In one example, the electrode layer may have a transmittance of 80% or more, 85% or more, or 90% or more for light having any one wavelength in a visible light region, for example, in a range of about 400 nm to 700 nm, or a wavelength of 550 nm.

The electrode layer also has a low light transmittance in an infrared region, so it may have a high electric conductivity and a low sheet resistance value as well as an effect of blocking heat.

In one example, the electrode layer may have a transmittance of 70% or less, 65% or less, or 60% or less for light having any one wavelength in an infrared region, for example, in a range of about 700 nm to 1000 nm, or a wavelength of 780 nm or more. The lower limit of the light transmittance of the electrode layer in the infrared region is not particularly limited, but the lower limit may be, for example, 0% or more, or 5% or more. That is, the light transmittance may be 0 to 70%, 5 to 65%, or 5 to 60%. Since the electrode layer satisfying the above numerical range can block heat in the infrared region, for example, energy saving is possible.

The electrode layer may have a sheet resistance value of 500Ω/□ or less, 400Ω/□, or 300Ω/□ or less, and the lower limit is not particularly limited, but may be 1Ω/□ or more, 5Ω/□ or more, or 10Ω/□ or more. That is, the sheet resistance value may be 1 to 500Ω/□, 5 to 400Ω/□ or 10 to 300Ω/□. When the electrode layer having the sheet resistance value in the above numerical range is applied to the optical element, the power consumption can be minimized, so that there is an advantage that the efficiency of the optical element can be increased.

As long as the material of the electrode layer is one having the light transmittance and the sheet resistance value and capable of applying an appropriate external action to change the orientation of the liquid crystal compound, any known one may be used without limitation.

For example, the electrode layer may utilize metal oxides; metal wires; metal nanotubes; metal meshes; carbon nanotubes; graphenes; or conductive polymers or composite materials thereof.

In one example, the electrode layer may comprise a metal oxide of at least one metal selected from the group consisting of antimony (Sb), barium (Ba), gallium (Ga), germanium (Ge), hafnium (Hf), indium (In), lanthanum (La), magnesium (Mg), selenium (Se), aluminum (Al), silicon (Si), tantalum (Ta), titanium (Ti), vanadium (V), yttrium (Y), zinc (Zn), and zirconium (Zr).

The thickness of the electrode layer can be suitably selected within a range that does not impair the purpose of the present invention. For example, in order to exhibit high light transmittance in the visible light region, low light transmittance in the infrared region, excellent electrical conductivity and low resistance characteristics, the thickness of the electrode layer can be adjusted within the range of 50 nm to 300 nm or 70 nm to 200 nm.

The electrode layer may be a single layer structure comprising the above-described material or a laminated structure. In addition, when the electrode layer is a laminated structure, the materials constituting each layer may be the same or different.

The liquid crystal window comprises an alignment film which is located on both sides of the liquid crystal layer to induce the orientation of the liquid crystal compound.

The alignment film may be contained in the liquid crystal window at a position that can induce the orientation of the liquid crystal compound included in the liquid crystal layer, for example, in a state where the alignment film is in direct contact with both sides of the liquid crystal layer.

Any one of the alignment films included in the liquid crystal window incorporates spacers.

That is, the present invention can prevent damage of the base layer due to heat by including the spacers together in a composition for forming an alignment film to form the alignment film, thereby promoting economic efficiency on processes.

Furthermore, the present invention can appropriately adjust the content of the spacers contained in the composition for forming an alignment film to secure dispersibility of the spacers in the composition, and ultimately achieve appropriate orientation characteristics.

As the alignment film, a known vertical, horizontal or tilt alignment film can be used without any particular limitation. Such an alignment film may be a contact type alignment film such as a rubbing alignment film or a known alignment film such as a photo-alignment film which comprises a photo-orientable compound, so that it may exhibit orientation characteristics, for example, by a noncontact type method such as irradiation of the linearly polarized light.

In one example, the alignment film may be a photo-curable alignment film or a thermosetting alignment film which imparts orientation characteristics by coating a composition for forming an alignment film and then irradiating it with light or heat.

The photo-alignment film may comprise, for example, a photo-orientable compound.

In the present invention, the term "photo-orientable compound" may mean a compound aligned in a predetermined direction (orientationally ordered) through irradiation of light and capable of orienting a neighboring liquid crystal compound in a predetermined direction through an interaction such as an anisotropic interaction in the aligned state.

In the photo-alignment film, the photo-orientable compound may exist in an aligned state so as to have orientation. The photo-orientable compound may be a monomolecular compound, a monomeric compound, an oligomeric compound or a polymeric compound. In addition, the photo-orientable compound may be a compound comprising a photosensitive moiety.

Specifically, as the photo-orientable compound, a compound aligned by trans-cis photoisomerization; a compound aligned by photo-destruction such as chain scission or photo-oxidation; a compound aligned by photo-crosslinking or photopolymerization such as [2+2] cycloaddition, [4+4] cycloaddition or photodimerization; a compound aligned by photo-Fries rearrangement; or a compound aligned by a ring opening/closure reaction; and the like, can be used.

As the compound aligned by trans-cis photoisomerization, for example, azo compounds such as sulfonated diazo dyes or azo polymers, or stilbenes, and the like can be exemplified.

As the compound aligned by photo-destruction, cyclobutane-1,2,3,4-tetracarboxylic dianhydride; aromatic polysilanes or polyesters; polystyrenes; or polyimides; and the like can be exemplified.

As the compound aligned by photo-crosslinking or photopolymerization, a cinnamate compound, a coumarin compound, a cinnamamide compound, a tetrahydrophthalimide compound, a maleimide compound, a benzophenone compound, a diphenylacetylene compound, a compound having a chalconyl moiety (hereinafter, a chalcone compound) or a compound having an anthracenyl moiety (hereinafter, an anthracenyl compound), as the photosensitive moiety, can be exemplified.

The photo-orientable compound may be a monomolecular compound, a monomeric compound, an oligomeric compound or a polymeric compound, or may be in a blend form of the photo-orientable compound and a polymer. Here, the oligomeric or polymeric compound may have a residue derived from the above-described photo-orientable compound, or the above-described photosensitive moiety in the main chain or side chains.

As the polymer having the residue derived from the photo-orientable compound, or the photosensitive moiety or capable of being mixed with the photo-orientable compound, polynorbornenes, polyolefins, polyarylates, polyacrylates, poly(meth)acrylates, polyimides, poly(amic acid)s, polymaleinimides, polyacrylamides, polymethacrylamides, polyvinyl ethers, polyvinyl esters, polystyrenes, polysiloxanes, polyacrylonitriles or polymethacrylonitriles, and the like, can be exemplified, without being limited thereto.

As the polymer that can be included in the orientable compound, typically, polynorbornene cinnamate, polynorbornene alkoxy cinnamate, polynorbornene allyloyloxycinnamate, polynorbornene fluorinated cinnamate, polynorbornene chlorinated cinnamate, or polynorbornene dicinnamate, and the like, can be exemplified, without being limited thereto.

The photo-orientable compound for forming the alignment film can be selected from those described above in consideration of the mixing property with the spacers and the dispersion property of the spacers in a solution.

The photo-alignment film can be formed, for example, by combining the photo-orientable compound with necessary additives such as a photoinitiator, coating it, and then irradiating it with the polarized ultraviolet in a desired direction, and the like.

In a specific example, the alignment film may be a coating layer of a composition comprising an orientable compound and spacers.

The content of the spacers in such a composition can be appropriately controlled within a range of 0.1 to 5% by weight, 0.5 to 3% by weight, 0.5 to 2% by weight or 0.5 to 1.5% by weight relative to the composition solution. Within this range, the spacers may be present in a state in which they are appropriately dispersed in the composition, may not deteriorate the orientation characteristics of the alignment film, and may achieve the cell gap maintaining characteristics.

The liquid crystal window comprises spacers formed so that gaps of layers existing in the upper and lower portions of the liquid crystal layer can be maintained, and embedded in and fixed to any one of the alignment films positioned on both sides of the liquid crystal layer. That is, the spacer of the present invention is a fixed type, and may be embedded in and fixed to an alignment film.

The spacer embedded in the alignment film has a shape capable of being evenly dispersed in the composition for forming orientation and securing the cell gap maintaining characteristics, and for example, may be a ball type spacer.

The spacer of the present invention, for example, the ball type spacer, can additionally promote not only the cell gap maintaining characteristics, but also damage prevention of the base layer due to thermal deformation and economic efficiency of the process for producing the liquid crystal window, and the like, by fixing the spacer, while forming the alignment film, without using a separate thermal fixing method.

The spacer may comprise, for example, any one selected from the group consisting of a thermosetting or ultraviolet curable resin; glass fiber; and silica.

As the thermosetting resin, for example, a silicone resin, a silicon resin, a furan resin, a polyurethane resin, an epoxy resin, an amino resin, a phenol resin, a urea resin, a polyester resin or a melamine resin may be used, without being limited thereto.

As the ultraviolet curable resin, typically, an acrylic polymer such as a polyester (meth) acrylate polymer, a polystyrene (meth) acrylate polymer, an epoxy (meth) acrylate polymer, a polyurethane (meth) acrylate polymer, a polybutadiene (meth) acrylate polymer, a silicone (meth) acrylate polymer, or an alkyl (meth) acrylate polymer may be used, without being limited thereto. Here, "(meth) acrylate" means acrylate or methacrylate.

Such a spacer may have a diameter larger than the thickness of the alignment film. That is, as shown in FIG. 1, in order for the spacer to be embedded in the alignment film and secure the cell gap maintaining characteristics, the diameter of the spacer should be larger than the thickness of the alignment film itself.

In one example, the diameter of the spacer may be in the range of 1 to 100 μm. In another example, the diameter of the spacer may be in the range of 5 to 30 μm, 10 to 30 μm, or 15 to 30 μm.

The spacer may be, preferably, partially embedded in the alignment film, without being entirely embedded. When partially embedded, the spacer may be embedded over the entire thickness of the alignment film, or may be embedded in only a part of the thickness direction of the alignment film. The penetration depth of the spacer in the alignment film may be 0.1 to 50%, 1 to 40%, 3 to 30%, or 5 to 20% as compared with the diameter of the spacer for one or both of the alignment films. The spacer may be partially embedded only in one alignment film and the upper or lower portion of the spacer may be in contact with the other alignment film. In addition, the spacer may be partially embedded in both alignment films, respectively. In the site without the spacer, the liquid crystal layer can directly contact the upper and lower alignment films, respectively.

Furthermore, the spacer may be a white or black spacer. In one example, the spacer may be a black ball spacer.

Here, the term "white spacer" means a transparent spacer having a transmittance of 85% or more for light having a wavelength of 550 nm, and the term "black spacer" means a spacer having a transmittance of 20% or less for light having a wavelength of 550 nm.

Although the liquid crystal window has a property of varying the transmittance depending on the presence or absence of external action, there may be a problem that the initial haze characteristics are reduced by the spacer, when the external action is not applied to the liquid crystal layer in such a liquid crystal window. However, when a black ball spacer is introduced, a low haze value can be maintained regardless of whether or not external action is applied.

The liquid crystal window of the present invention may further comprise a sealant located on both sides of the liquid crystal layer. Such a sealant can serve to seal the liquid crystal compound in the liquid crystal layer simultaneously with maintaining a gap of the liquid crystal layer by being located at the sides of the liquid crystal layer.

In one example, the sealant may be a polymer layer. Such a polymer layer may be, for example, a type capable of thermal curing, UV curing or thermal curing and UV curing together.

In one example, the sealant may be an acrylic polymer layer comprising polymerized units of (meth) acrylic acid esters.

The (meth) acrylic acid ester means methacrylic acid or acrylic acid or derivatives thereof, where the specific (meth) acrylic acid ester may be an alkyl (meth) acrylate having an alkyl group having 1 to 14 carbon atoms, and examples thereof may include methyl (meth) acrylate, ethyl (meth) acrylate, n-propyl (meth) acrylate, isopropyl (meth) acrylate, n-butyl (meth) acrylate, t-butyl (meth) acrylate, sec-butyl (meth) acrylate, isobutyl (meth) acrylate, 2-ethylhexyl (meth) acrylate, 2-ethylbutyl (meth) acrylate, pentyl (meth) acrylate, hexyl (meth) acrylate, n-octyl (meth) acrylate, decyl (meth) acrylate, dodecyl (meth) acrylate, tridecyl (meth) acrylate, octadecyl (meth) acrylate, isooctyl (meth) acrylate, isononyl (meth) acrylate or tetradecyl (meth) acrylate, and the like, but are not limited thereto.

In addition, the acrylic polymer layer may further comprise polymerized units of a monomer having other crosslinkable functional groups. As the monomer having other crosslinkable functional groups, for example, a monomer having a hydroxyl group such as hydroxyalkyl (meth) acrylate, for example, 2-hydroxyethyl (meth) acrylate, 2-hydroxypropyl (meth) acrylate, 4-hydroxybutyl (meth) acrylate, 6-hydroxyhexyl (meth) acrylate or 8-hydroxyoctyl (meth) acrylate, 2-hydroxypolyethylene glycol (meth) acrylate or 2-hydroxypolypropylene glycol (meth) acrylate; or a monomer having a carboxyl group such as (meth) acrylic acid, 2-(meth) acryloyloxyacetic acid, 3-(meth) acryloyloxypropionic acid, 4-(meth) acryloyloxybutyric acid, acrylic acid dimer, itaconic acid, maleic acid or maleic anhydride, and the like, can be exemplified, without being limited thereto.

The sealant may have a thickness, for example, in the range of 5 to 100 μm, and may provide structural stability to the liquid crystal layer within this range.

In one example, the sealant may have a width of 3 mm to 15 mm, without being limited thereto.

The sealant may have, for example, an area of 30% or less, 20% or less, 10% or less, or 1% or less relative to the area of the liquid crystal window surface. The area means the ratio of the surface that the sealant is in contact with the alignment film and the like. Within this area range, the sealant may serve to maintain the gap of the liquid crystal layer and to seal the liquid crystal layer, and may not hinder variable characteristics of transmittance of the liquid crystal compound in the liquid crystal layer.

In addition to the above-mentioned polymer, the sealant may further comprise an appropriate additive in order to control variable characteristics of transmittance, or rigidity. For example, the sealant may further comprise an appropriate amount of the known inorganic particles, inorganic pigments, and the like in order to control variable characteristics of transmittance, or rigidity and the like.

The present invention also relates to an optical element comprising a liquid crystal window.

In one example, the optical element comprises a first substrate; a first polarizing layer positioned on the first substrate; and a liquid crystal window existing on the opposite side of the surface of the first polarizing layer where the first substrate is located. In addition, the liquid crystal window comprises a liquid crystal layer containing a liquid crystal compound; an alignment film layer positioned on both sides of the liquid crystal layer to induce orientation of the liquid crystal compound; and spacers formed so that gaps of layers existing in the upper and lower portions of the liquid crystal layer can be maintained, and embedded in and fixed to any one of the alignment films positioned on both sides of the liquid crystal layer.

The optical element of the present invention can reduce damage of the base layer by a fixing process of spacers or restriction on the process time by comprising the liquid crystal window including the spacers embedded in the alignment film.

Such an optical element has a variable transmittance depending on whether or not the external action is applied, and such an optical element can be used as a transmittance variable member, for example, a sunroof for a vehicle, and the like.

The optical element according to the present invention can selectively switch between a transmissive mode and a blocking mode by introducing a liquid crystal layer comprising a liquid crystal compound that varies depending on whether or not external action is applied.

In the present invention, the term "transmissive mode" may mean a state in which the transmittance of the visible light region is 15% or more, 20% or more, 25% or more, 30% or more, or 40% or more. That is, the transmittance of the transmissive mode may be 15 to 100%, 20 to 100%, 25 to 100%, 30 to 100%, or 40 to 100%.

In the present invention, the term "blocking mode" may mean a state in which the transmittance of the visible light region is 3% or less, 2% or less or 1% or less. That is, the transmittance of the blocking mode may be 0 to 3%, 0 to 2%, or 0 to 1%.

In one example, the optical element of the present invention can switch between the transmissive mode in which the transmittance of the visible light region is 15% or more (15 to 100%) and the blocking mode in which the transmittance of the visible light region is 3% or less (0 to 3%), by the external action. The transmittance of the optical element may be, for example, a value measured for a C standard light source.

The first substrate of the optical element serves as a supporting body of the element, and for example, a material having appropriate rigidity and low bending characteristics and having appropriate transparency can be used in the present invention without limitation.

In one example, the first substrate may be a glass substrate; a crystalline or amorphous silicone film; an inorganic film such as a quartz or ITO film; or a plastic substrate.

In a specific example, as the plastic substrate, one comprising TAC (triacetyl cellulose); COP (cyclo olefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (polyether sulfone); PEEK (polyetheretherketone); PPS (polyphenylsulfone); PEI (polyetherimide); PEN (polyethylenenaphthalate); PET (polyethyleneterephthalate); PI (polyimide); PSF (polysulfone); PAR (polyarylate) or an amorphous fluororesin may be used, but is not limited thereto.

The first substrate may have, for example, a coefficient of thermal expansion (CTE) of 100 ppm/K or less, 90 ppm/K or less, 80 ppm/K or less, 70 ppm/K or less, 60 ppm/K or less, 50 ppm/K or less, 40 ppm/K or less, 30 ppm/K or less, or 20 ppm/K or less. The lower limit of the coefficient of thermal expansion (CTE) may be, for example, 3 ppm/K or more, 5 ppm/K or more, or 7 ppm/K or more, but is not limited thereto. That is, the coefficient of thermal expansion of the first substrate may be 3 to 100 ppm/K, 5 to 80 ppm/K or 7 to 60 ppm/K. Within such a range of coefficient of thermal expansion (CTE), the appropriate rigidity can be maintained, and the thermal deformation according to the laminated structure of the liquid crystal window, the polarizing layer and the like can be prevented. The value of the coefficient of thermal expansion (CTE) may be, for example, a value calculating the average thermal expansion coefficient measured with cooling and heating at a rate of 10° C./min in a temperature range of 0° C. to 100° C. as a coefficient of linear thermal expansion.

The first substrate may have, for example, an elastic modulus of 20 GPa or more, 30 GPa or more, 40 GPa or more, or 50 GPa or more. The upper limit of the elastic modulus may be, for example, 150 GPa or less, 100 GPa or less, 80 GPa or less, but is not limited thereto. That is, the elastic modulus of the first substrate may be 20 to 150 GPa, 30 to 100 GPa, or 40 to 80 GPa. Within such a range of elastic modulus, the appropriate rigidity can be maintained, the thermal deformation according to the laminated structure of the liquid crystal window, the polarizing layer and the like can be prevented. The elastic modulus value may mean a value measured according to ASTM D882.

The optical element according to the present invention can also effectively prevent deformation of the element due to the difference in an elastic modulus and a coefficient of thermal expansion between a substrate and a polarizing layer or between the substrate and other layers by appropriately designing positions and structures of a substrate, a polarizing layer and a liquid crystal layer.

In one example, by adjacently disposing the first substrate and the first polarizing layer, the optical element of the present invention may minimize the stress that may occur depending on the difference of thermal expansion coefficient and elastic modulus between the substrate, the polarizing layer, and a base layer in the liquid crystal window, and ultimately prevent the deformation according to shrinkage or expansion of the element and the change of optical physical properties.

In addition, the optical element of the present invention can prevent deformation due to shrinkage or expansion of the element and damage of the sealant supporting the liquid crystal layer.

The first polarizing layer may be, for example, in direct contact with the first substrate, or may be attached to the first substrate via a pressure-sensitive adhesive layer or an adhesive layer.

In the present invention, the term "polarizing layer" may mean a functional layer that exhibits selective transmission and blocking properties, for example, reflection or absorption properties, for incident light. The polarizing layer may have, for example, a function of transmitting light which vibrates in one direction from incident light which vibrates in various directions, and blocking light which vibrates in the other directions.

The type of the polarizing layer is not particularly limited, and a reflective type, an absorptive type, or a scattering type of polarizing layer, and the like can be exemplified.

As the reflective polarizing layer, for example, a DBEF (dual brightness enhancement film), a lyotropic liquid crystal layer (LLC layer), a wire grid polarizer or the like can be used, and as the absorptive polarizing layer, a polarizer, in which iodine is dyed on a polymer stretched film such as a PVA stretched film, or a guest-host polarizing layer, in which the host is liquid crystals polymerized in an oriented state and the guest is anisotropic dye arranged in accordance with the orientation of the liquid crystals, can be used, without being limited thereto.

The first polarizing layer may have a predetermined absorption axis.

In one example, the absorption axis of the first polarizing layer and the optical axis of the liquid crystal layer may be formed at an angle of, for example, 0 to 90 degrees in the absence of the external action. By controlling the angle between the absorption axis of the first polarizing layer and the optical axis of the liquid crystal layer within the angular range, the transmittance of light in the visible light region can be adjusted.

In the present invention, the term "optical axis" may mean a slow axis when the incident light passes through the relevant region, and when the liquid crystal compound has a rod shape, it may mean the long axis direction of the rod and when the liquid crystal compound has a discostic shape, it may mean the normal direction of the disc surface.

For example, the liquid crystal compound in the liquid crystal layer may be oriented in a horizontal orientation, a vertical orientation, or an oblique orientation, where the angle between the absorption axis of the first polarizing layer and the optical axis of the liquid crystal layer may vary depending on the orientation state of such a liquid crystal compound.

The optical element of the present invention may include not only a case where a polarizing layer exists in any one side direction of a liquid crystal layer but also a structure where a liquid crystal layer exists between two opposing polarizing layers, depending on the type of the liquid crystal layer.

In one example, the optical element of the present invention may further comprise a second polarizing layer located on the opposite side of the surface on which the first polarizing layer of the liquid crystal window is located.

The absorption axis of the second polarizing layer may be, for example, vertical to the absorption axis of the first polarizing layer. In the present invention, the term "vertical"

means substantially vertical, and it can be understood that it includes errors within ±5 degrees, ±4 degrees, ±3 degrees, ±2 degrees.

A liquid crystal layer containing a liquid crystal compound exists in the liquid crystal window of the optical element, and as described above, the initial orientation state can be changed according to the drive mode of the liquid crystal window.

In one example, the liquid crystal compound is present in an oriented state to form an angle with the absorption axis of the first polarizing plate, or in a state oriented to be horizontal or vertical to the absorption axis of the first polarizing plate, or in a twist oriented state.

In the present invention, the term "twist oriented state" may mean a state where the optical axis of the liquid crystal layer is oriented horizontally with an inclination angle within a range of about 0 to 15 degrees, about 0 to 10 degrees or about 0 to 5 degrees with respect to the plane of the liquid crystal layer, but the angle of the long axis direction of the neighboring liquid crystal compound contained in the liquid crystal layer slightly varies and is twisted and arranged.

The liquid crystal compound in such a liquid crystal layer can have an alignment property changed by application of external action.

In one example, in the absence of the external action, when the liquid crystal layer is in a horizontal orientation, the transmittance can be increased by switching to a vertical orientation state by application of the external action.

In another example, in the absence of the external action, when the liquid crystal layer is in a vertical orientation, the transmittance can be reduced by switching to a horizontal orientation state by application of the external action. In addition, in switching from the initial vertical orientation state to the horizontal orientation state, a pre-tilt in a certain direction may be required to determine the orientation direction of the liquid crystal compound. Here, the method of imparting the pre-tilt is not particularly limited, and for example, it is allowed by disposing an alignment film, so that the intended pre-tilt may be imparted.

In addition, in a state where the liquid crystal layer further comprises an anisotropic dye and the liquid crystal compound is vertically oriented in the above, the alignment direction of the anisotropic dye is vertical to the plane of the polarizing layer present in the bottom, and thus the light transmitted through the polarizing layer can be transmitted without being absorbed by the anisotropic dye of the liquid crystal layer, thereby increasing the transmittance of the optical element. On the other hand, in a state where the liquid crystal compound in the liquid crystal layer is horizontally oriented, the alignment direction of the anisotropic dye is parallel to the plane of the polarizing layer present in the bottom, and thus when the optical axis of the liquid crystal layer is disposed to have a predetermined angle for the absorption axis of the polarizing layer, a part of the light transmitted through the polarizing layer can be absorbed by the anisotropic dye, thereby reducing the transmittance of the optical element.

The liquid crystal window included in the optical element may comprise, for example, a base layer in any one side or both side directions of the liquid crystal layer.

In one example, the base layer may be located only in any one side direction of the liquid crystal layer.

Specifically, as shown in FIG. 2, the optical element (2000) of the present invention may have a structure which comprises a liquid crystal layer (100), and alignment films (200a, 200b) and electrode layers (300a, 300b) sequentially disposed on both sides of the liquid crystal layer (100), and comprises a base layer (500b) that is present in the opposite side of the surface of the liquid crystal layer (100) on which a first polarizing layer (400) is located. In this case, the first polarizing layer (400) may be in direct contact with a liquid crystal window (1000). In the present invention, the term "B in direct contact with A" means a state in which any layer or configuration is not disposed between A and B.

In addition, reviewing FIG. 2 more, when the liquid crystal window (1000) of the optical element (2000) of the present invention comprises one base layer (500b), the opposite side of the surface of the first polarizing layer (400) that is in contact with the liquid crystal window (1000) may be attached to the first substrate (700a) via a pressure-sensitive adhesive layer or an adhesive layer (600).

As shown in FIG. 2, when the first polarizing layer (400) has a structure which is in direct contact with the liquid crystal window (1000), specifically, a structure that the base layer (500b) is located only on the opposite side of the surface of the liquid crystal layer (100) on which the first polarizing layer (400) is located, the deformation depending on shrinkage or expansion of the element due to the difference in coefficient of thermal expansion (CTE) and elastic modulus among the substrate, the polarizing layer and the base layer, and the like can be prevented, and the optical physical property change rate (%) and deformation rate (%) such as the transmittance of the desired optical element can be minimized.

In another example, the base layer may be positioned on both side directions of the liquid crystal layer.

Specifically, as shown in FIG. 3, the optical element (2000) of the present invention may have a structure which comprises a liquid crystal layer (100), and alignment films (200a, 200b), electrode layers (300a, 300b) and base layers (500a, 500b) sequentially disposed on both sides of the liquid crystal layer (100). In this case, the first polarizing layer (400) may be attached to the liquid crystal window (1000) via the pressure-sensitive adhesive layer or the adhesive layer (600) and the opposite side of the surface of the first polarizing layer (400) that is in contact with the liquid crystal window (1000) may be attached to the first substrate (700a) via the pressure-sensitive adhesive layer or the adhesive layer (600).

In the pressure-sensitive adhesive layer or the adhesive layer interposed between the first polarizing layer and the first substrate, for example, known pressure-sensitive adhesives or adhesives such as acrylic-based; epoxy-based; urethane-based; or rubber-based pressure-sensitive adhesives or adhesives may be utilized without limitation.

For example, the pressure-sensitive adhesive layer or the adhesive layer may have a gel content (%), represented by Equation 4 below, within a range of 30 to 95%.

$$\text{Gel content (\%)} = B/A \times 100 \qquad [\text{Equation 4}]$$

In Equation 4 above, A represents a mass of a pressure-sensitive adhesive layer or an adhesive layer, and B represents a dry mass of the insoluble matter of the pressure-sensitive adhesive layer or the pressure-sensitive adhesive layer after immersing it in ethyl acetate at room temperature for 72 hours. If the gel content is less than 30%, there is a concern that the endurance reliability is deteriorated under high temperature and/or high temperature and humidity conditions, and if the gel content exceeds 95%, there is a concern that the stress relaxation characteristics of the pressure-sensitive adhesive layer or the adhesive layer is deteriorated.

The pressure-sensitive adhesive layer or the adhesive layer may have a thickness within a range of, for example, 10 μm to 100 μm. Within such a thickness range, excellent mechanical properties can be achieved, while exhibiting the desired pressure-sensitive adhesion or adhesion properties.

The pressure-sensitive adhesive layer may have, for example, a dynamic viscosity at 25° C. within a range of 10,000 cSt to 10,000,000 cSt.

In the structure of the optical element of the present invention, when the base layer included in the liquid crystal window is located on both side directions of the liquid crystal layer, the first polarizing layer may have the structure attached to the liquid crystal window via the pressure-sensitive adhesive layer or the adhesive layer, as described above, where the pressure-sensitive adhesive layer or the adhesive layer attaching the first polarizing layer and the liquid crystal window may be, for example, the above-mentioned fluid pressure-sensitive adhesive layer.

In the present invention, the term "fluid pressure-sensitive adhesive layer" means an uncured pressure-sensitive adhesive layer having a freezing point of −40° C. or lower (−200 to −40° C.) or a boiling point of 150° C. or higher (150 to 500° C.). Such a fluid pressure-sensitive adhesive layer may have, for example, a dynamic viscosity at 25° C. within a range of 10,000 cSt to 100,000 cSt.

The material for forming the fluid pressure-sensitive adhesive layer is an uncured type pressure-sensitive adhesive satisfying the above-mentioned freezing point or boiling point, and any known material can be used without limitation.

In one example, the fluid pressure-sensitive adhesive layer may be exemplified by silicone oil and the like, but is not limited thereto.

The fluid pressure-sensitive adhesive layer may have, for example, a freezing point of −40° C. or lower or −35° C. or lower. In addition, the fluid pressure-sensitive adhesive layer may have a boiling point of 150° C. or higher, or 180° C. or higher. It is possible to effectively prevent deformation of the element due to heat within such a range of freezing point and boiling point.

Specifically, the fluid pressure-sensitive adhesive layer may have a freezing point of −40° C. or lower and a boiling point of 150° C. or higher.

When the first polarizing layer and the liquid crystal window are adhered to each other via such a fluid pressure-sensitive adhesive layer, a phenomenon of intensifying stress in the element due to thermal deformation according to the difference in coefficient of thermal expansion (CTE) and elastic modulus among the substrate, the polarizing layer and the base layer, can be prevented, and ultimately, the deformation of the element and thus the change of the optical physical properties can be effectively prevented.

In addition, the optical element of the present invention may have a structure in which the first substrate and the first polarizing layer are in direct contact with each other when the optical element is a structure comprising base layers in both side directions of the liquid crystal layer. Here, the optical element may further comprise a second substrate located on the opposite side of the surface of the liquid crystal window where the first polarizing layer contacts.

That is, when the optical element of the present invention is a structure comprising base layers in both side directions of the liquid crystal layer, the first polarizing layer may be attached to the first substrate via a pressure-sensitive adhesive layer or an adhesive layer as shown in FIG. 3, or both sides of the first polarizing layer may be in direct contact with the first substrate and the liquid crystal window as shown in FIG. 4. In this case, the optical element may further comprise a second substrate located on the opposite side of the surface of the liquid crystal window where the first polarizing layer contacts.

FIG. 4 is an illustrative diagram of an optical element according to the present invention. Specifically, as shown in FIG. 4, the optical element (2000) may be a structure which comprises alignment films (200a, 200b), electrode layers (300a, 300b) and base layers (500a, 500b) sequentially disposed on both sides of a liquid crystal layer (100), wherein any one side of a first polarizing layer (400) is in direct contact with the base layer (500a) of the liquid crystal window (1000) and the other side of the first polarizing layer (400) is in direct contact with a first substrate (700a), and further comprises a second substrate (700b) located on the opposite side of the surface where the first polarizing layer (400) is in contact with the first substrate (700a).

That is, in the case of the optical element (2000) having the structure as shown in FIG. 4, since the liquid crystal window (1000) and the polarizing layer (400) are not attached via the pressure-sensitive adhesive layer or the adhesive layer (600) and the first and second substrates (700a, 700b) do not attach the polarizing layer (400) or the liquid crystal window (1000) via the pressure-sensitive adhesive layer or the adhesive layer (600) as well, the polarizing layer (400) and the liquid crystal window (1000) can move freely between the substrates (700a, 700b), and thus the phenomenon of intensifying stress due to the difference in thermal deformation among the substrate, the polarizing layer and the base layer, and the resulting problem of deformation of the element may not occur.

The specific types of the second substrate are the same as those described in the first substrate, and the specific materials of the first substrate and the second substrate may be the same or may be changed within a range that does not impair the above-mentioned object.

The optical element of the present invention may also comprise a viewing angle compensation film. The viewing angle compensation film may be a single layer structure or a laminated structure including, for example, an A plate, a +B plate, a −B plate, and a +C plate. Such a viewing angle compensation film is a configuration that can be applied, for example, when the optical element is driven in the ECB mode.

The present invention also relates to a method of manufacturing a liquid crystal window.

The method of manufacturing a liquid crystal window of the present invention can overcome deformation of the base layer caused by the thermal fixing method, or limitation on the process by including spacers in a composition for forming an alignment film, and embedding the spacers in the alignment film and fixing them, while forming the alignment film, and further appropriately secure the orientation characteristics of the alignment film by including an appropriate amount of spacers in the composition.

That is, a method of manufacturing a liquid crystal window for an optical element according to the present invention comprises steps of: coating a composition for forming an alignment film comprising spacers and an orientable compound on a base layer; and coating a composition for forming a liquid crystal layer comprising a liquid crystal compound.

The kind and physical properties of the base layer can be used the same as those mentioned in the above-described liquid crystal window, and a process for forming an electrode layer may be further included before coating the composition for forming an alignment film on the base layer, in order to apply an external electric field to the liquid crystal layer.

The composition for forming an alignment film comprises an orientable compound and spacers. The orientable compound may be, for example, a photo-orientable compound, and the specific kind thereof is as described above.

The composition for forming an alignment film comprises spacers.

The composition for forming an alignment film may comprise spacers in an amount within a range of 0.1 to 5% by weight. If the content of the spacers is excessively large, the dispersibility is lowered, so that it becomes difficult to secure the orientation characteristics, whereas if the content of the spacers is too small, it may be difficult to maintain the cell gap, and thus the appropriate range can be selected within the above-described range in consideration of the dispersion characteristics or the effect of maintaining the cell gap. In another example, the content of the spacers may be in the range of 0.5% by weight to 3.5% by weight or 0.6% by weight to 3% by weight relative to the composition solution.

The composition for forming an alignment film may further comprise a solvent capable of promoting an appropriate dispersion of the spacers and the orientable compound. A known suitable organic solvent can be used as the solvent in consideration of a temperature for forming the alignment film, and the like.

In one example, the organic solvent may include methanol, ethanol, 1-propanol, 2-propanol, 1-butanol, 2-butanol, isobutyl alcohol, tert-butyl alcohol, acetone, 2-butanone, ethyl acetate, propyl acetate, tetrahydrofuran, acetonitrile, dioxane, toluene, xylene, cyclopentanone, cyclohexanone, diacetone alcohol, ethylene glycol monoethyl ether, ethylene glycol monobutyl ether, propylene glycol monomethyl ether, propylene glycol monomethyl ether acetate, diethylene glycol monoethyl ether, diethylene glycol dimethyl ether, diethylene glycol methyl ethyl ether, methyl 3-methoxypropionate, ethyl 3-ethoxypropionate, N-methylpyrrolidone, or γ-butyrolactone, and the like.

The method of coating the composition for forming an alignment film is not particularly limited and a known coating method such as bar coating, gravure coating, reverse roll coating, reverse gravure coating, slot die coating, comma coating, spray coating, knife coating, die coating, dip coating, micro gravure coating or wire bar coating may be used, but is not limited thereto.

After coating the composition for forming an alignment film on the base layer, a process of curing the coated composition may be further included, in order to form an alignment film.

As the curing process, for example, all the methods of known processes for forming the alignment film by applying appropriate energy to the composition for forming an alignment film, volatilizing the solvent and curing the composition, can be utilized without limitation, and for example, the composition can be cured by applying appropriate heat and/or light.

In one example, the curing process may comprise a process of drying the composition for forming an alignment film coated on the base layer in an oven at 50 to 150° C. for 10 seconds to 1,000 seconds, and then irradiating it with UV light, for example, polarized UV light at an appropriate light intensity. Preferably, the drying temperature (oven temperature) may be from 60 to 100° C., and the drying time may be from 50 seconds to 300 seconds.

When the curing process is carried out, the alignment film may be formed on the base layer, and as shown in FIG. 1, the spacers may be embedded in and fixed to the alignment film.

The method of manufacturing a liquid crystal window according to the present invention also comprises a step of coating a composition for forming a liquid crystal layer containing a liquid crystal compound.

As the liquid crystal compound contained in the composition for forming a liquid crystal layer, the smectic, cholesteric or nematic liquid crystal compound mentioned in the liquid crystal window can be used, and as the coating method of the composition for forming a liquid crystal layer, the known coating methods as described above can be used without limitation.

Also, the method of manufacturing a liquid crystal window according to the present invention may further comprise a process of laminating one sequentially forming an electrode layer and an alignment film on a base layer, with a base layer comprising spacers embedded in and fixed to the alignment film, which is formed by the above-described process, and a liquid crystal layer formed thereon.

The present invention also relates to a use of the optical element. The optical element of the present invention can vary the transmittance depending on whether or not an external signal is applied, and can effectively prevent a stress strengthening due to the difference in thermal deformation and the resulting deformation of the element. Such an optical element can be applied to and used in various optical apparatuses.

That is, the present invention relates to a transmittance variable member comprising an optical element. The transmittance variable member may be, for example, a sunroof.

In the present invention, the term "sunroof" is a fixed or operating (venting or sliding) opening present in the ceiling of a vehicle, and may be a collective meaning for apparatuses which are capable of functioning to allow light or fresh air to enter the interior of the vehicle. The manner of operating the sunroof in the present invention is not particularly limited, and the sunroof may be, for example, manually operated or motor-driven, and the shape, size or style of the sunroof may be appropriately selected depending on the intended use. For example, the sunroof may be exemplified by a pop-up type sunroof, a spoiler (tile & slide) type sunroof, an in-built type sunroof, a folding type sunroof, a top-mount type sunroof, a panoramic loop system type sunroof, a removable roof panels (t-tops or targa roofs) type sunroof or a solar type sunroof, and the like, but is not limited thereto.

The exemplary sunroof of the present invention may comprise the optical element of the present invention, and in this case, the specific details of the optical element can be applied equally by those described in the item of the optical element.

The sunroof may further comprise an ultraviolet blocking layer. The term "ultraviolet blocking layer" herein may mean a known functional layer having an ultraviolet blocking function. The ultraviolet blocking layer may be formed on one side or both sides of the polarizing layer, the liquid crystal layer, or the electrode layer. As such an ultraviolet blocking layer, for example, an ultraviolet blocking pressure-sensitive adhesive or an ultraviolet blocking film can be used. As the ultraviolet blocking pressure-sensitive adhesive, a pressure-sensitive adhesive, in which a known additive having an ultraviolet blocking function is added to a known pressure-sensitive adhesive component, may be used. As the ultraviolet blocking film, for example, those that a layer comprising a known additive having an ultraviolet blocking function is formed on one side of a known pressure-sensitive adhesive may be used. As the ultraviolet blocking pressure-sensitive adhesive, for example, EW1501-D1-UV, EW1502-D1-UV or EW1504-D1-UV from DAIO Paper Co. may be used, without being limited thereto.

Advantageous Effects

The liquid crystal window of the present invention has excellent orientation characteristics and simultaneously excellent cell gap maintaining characteristics by minimizing flowage of spacers.

The method of manufacturing a liquid crystal window according to the present invention can prevent damage of the base layer by heat and promote economic efficiency on processes.

BRIEF DESCRIPTION OF DRAWINGS

FIG. 1 is a diagram showing a structure in which spacers in a liquid crystal window of the present invention are embedded in an alignment film.

FIGS. 2 to 4 are each one illustrative diagram showing an optical element according to the present invention.

FIG. 5 shows SEM cross-sectional photographs and orientation states of spacers in liquid crystal windows according to Examples and Comparative Examples.

FIG. 6 shows the lamination test results for the liquid crystal windows according to Examples and Comparative Examples.

MODE FOR INVENTION

Hereinafter, the present invention will be described in more detail by way of examples, but they are only examples limited to the gist of the present invention. Furthermore, it is apparent to those skilled in the art that the present invention is not limited to the process conditions set forth in the following examples and the conditions may be optionally selected within the range of conditions necessary for achieving the object of the present invention.

Example 1

A composition for forming an alignment film containing 1 wt % of spacers was coated on a polycarbonate film, on which an ITO electrode layer having a size of 100×100 mm was formed, using a Meyer bar (#4), and then dried in an oven at 80° C. for 2 minutes and irradiated with polarized UV to form an alignment film. Thereafter, 1 g of liquid crystal (MDA-14-4145) was coated thereon to form a liquid crystal layer/alignment film/ITO electrode layer/polycarbonate film structure. Finally, the alignment film surface of the polycarbonate film on which the alignment film/ITO electrode layer were sequentially formed, and the surface of the liquid crystal layer were laminated together to manufacture a liquid crystal window.

As shown in FIG. 5, it can be confirmed that the spacer according to Example 1 is partly embedded in the alignment film to be included in a fixed state.

Comparative Example 1

An isopropyl alcohol solution containing 1 wt % of spacers was coated on a polycarbonate film, on which an alignment film/an ITO electrode layer having a size of 100 mm×100 mm were sequentially formed, using a Meyer bar (#4), and then dried and fixed in an oven at 120° C. for 10 minutes to form spacers fixed on the alignment film. Thereafter, 1 g of liquid crystal (MDA-14-4145) was coated on the surface of the alignment film on which the spacers were formed to form a liquid crystal layer/alignment film/ITO electrode layer/polycarbonate film structure. Finally, the alignment film surface of the polycarbonate film on which the alignment film/ITO electrode layer were sequentially formed, and the surface of the liquid crystal layer were laminated together to manufacture a liquid crystal window.

As shown in FIG. 5, it can be confirmed that the spacer according to Comparative Example 1 is fixed on the alignment film.

Test Example 1: Lamination Test

A lamination test of the liquid crystal windows according to Example 1 and Comparative Example 1 was carried out.

Specifically, the lamination test was performed in such a manner that the manufactured liquid crystal window was passed between upper/lower rubber rolls to apply pressure, and the result was shown in FIG. 6.

As shown in FIG. 6, the spacer according to Example 1 was embedded in the alignment film to have excellent fixation with being in a state of little change, but the spacer according to Comparative Example 1 was fixed on the alignment film to have a low fixation degree enough to visually confirm black dots. Accordingly, it could be confirmed that the liquid crystal window of the present invention is excellent in terms of the fixing property of the spacer.

The invention claimed is:

1. A liquid crystal window for an optical element comprising:
    a first alignment film having a first surface and an opposing second surface;
    a second alignment film;
    a gap formed between the first and second alignment films, the first surface of the first alignment film facing the gap;
    spacers disposed in the gap and maintaining the gap between the first and second alignment films, wherein the spacers are embedded in and fixed to only the first alignment film, and wherein the spacers extend from the second surface of the first alignment film to beyond the first surface into the gap; and
    a liquid crystal layer containing a liquid crystal compound, wherein the liquid crystal layer is disposed in the gap;
    wherein the first alignment film is a coating layer having a composition comprising an orientable compound and the spacers, wherein the spacers are present in the composition in a range of 0.1 to 5% by weight.

2. The liquid crystal window for an optical element according to claim 1, wherein
    the liquid crystal compound is a smectic, nematic or cholesteric liquid crystal compound, the liquid crystal layer further comprises an anisotropic dye having a dichroic ratio in a range of 1 to 30, and the liquid crystal layer has a thickness in a range of 5 to 30 μm.

3. The liquid crystal window for an optical element according to claim 1, further comprising:
    a base layer; and
    an electrode layer positioned between the base layer and the liquid crystal layer.

4. The liquid crystal window for an optical element according to claim 1, wherein the spacers are ball type spacers, and each of the spacers has a diameter in a range of 1 to 100 pm.

5. The liquid crystal window for an optical element according to claim 1, wherein
the spacers comprises any one selected from the group consisting of a thermosetting or ultraviolet curable resin, glass fiber, and silica.

6. The liquid crystal window for an optical element according to claim 1, wherein
the spacers are white or black spacers.

7. The liquid crystal window for an optical element according to claim 1, wherein
the spacers are partially embedded in the first alignment film and penetrate the first alignment film to a depth that is 0.1 to 50% as compared to a diameter of each of the spacers.

8. An optical element, comprising:
a first substrate;
a polarizing layer; and
the liquid crystal window of claim 1,
wherein the polarizing layer is positioned between the first substrate and the liquid crystal window.

9. The optical element according to claim 8, wherein the optical element is capable of switching between a transmissive mode and a blocking mode upon application of an external voltage,
wherein the transmissive mode has a transmittance of the visible light region is 15% to 100%, and
wherein the blocking mode has a transmittance of the visible light region is 0% to 3%
wherein the visible light region ranges from 400 nm to 700 nm.

10. The optical element according to claim 8, further comprising:
a pressure-sensitive adhesive layer,
wherein the liquid crystal window further comprises a base layer positioned such that the first or second alignment film is disposed between the base layer and the liquid crystal layer,
wherein the polarizing layer is attached to the base layer of the liquid crystal window via the pressure-sensitive adhesive layer, and
wherein the pressure-sensitive adhesive layer is a fluid pressure-sensitive adhesive layer having a freezing point of −40° C. or lower and a boiling point of 150° C. or higher.

11. The optical element according to claim 8, wherein
the liquid crystal window further comprises a base layer positioned such that the first or second alignment film is disposed between the base layer and the liquid crystal layer, and
wherein the polarizing layer is in direct contact with the base layer of liquid crystal window.

12. The optical element according to claim 8, wherein
the polarizing layer is in direct contact with the first substrate, or is attached to the first substrate via a pressure-sensitive adhesive layer or an adhesive layer.

13. The optical element according to claim 8, wherein
the polarizing layer is disposed between the first substrate and the liquid crystal window, wherein the polarizing layer is in direct contact with both the first substrate and the liquid crystal window.

14. The optical element according to claim 8, further comprising:
a second substrate,
wherein on the liquid crystal window is disposed between the first and second substrate.

* * * * *